(12) United States Patent
Riepl et al.

(10) Patent No.: US 10,691,117 B2
(45) Date of Patent: Jun. 23, 2020

(54) METHOD FOR MONITORING AN ELECTRONIC CONTROL UNIT AND CONTROL UNIT FOR A MOTOR VEHICLE

(71) Applicant: CONTINENTAL AUTOMOTIVE GMBH, Hannover (DE)

(72) Inventors: Thomas Riepl, Bad Abbach (DE); Stefan Peck, Regensburg (DE)

(73) Assignee: Vitesco Technologies GmbH, Hannover (DE)

( * ) Notice: Subject to any disclaimer, the term of this patent is extended or adjusted under 35 U.S.C. 154(b) by 0 days.

(21) Appl. No.: 15/791,121

(22) Filed: Oct. 23, 2017

(65) Prior Publication Data

US 2018/0046174 A1 Feb. 15, 2018

Related U.S. Application Data

(63) Continuation of application No. PCT/EP2016/059457, filed on Apr. 28, 2016.

(30) Foreign Application Priority Data

Apr. 29, 2015 (DE) .................. 10 2015 207 895

(51) Int. Cl.
*G05B 23/02* (2006.01)
*B60W 50/02* (2012.01)
*B60W 50/04* (2006.01)

(52) U.S. Cl.
CPC ..... *G05B 23/0235* (2013.01); *B60W 50/0205* (2013.01); *B60W 50/04* (2013.01);
(Continued)

(58) Field of Classification Search
None
See application file for complete search history.

(56) References Cited

U.S. PATENT DOCUMENTS 7,474,989 B1 * 1/2009 Wilcoxon .......... G05B 23/0254
700/21
2005/0011254 A1 1/2005 Swanson et al.
(Continued)

FOREIGN PATENT DOCUMENTS

CN 2670182 Y 1/2005
CN 1677286 A 10/2005
(Continued)

OTHER PUBLICATIONS

Office Action dated Mar. 13, 2019 for counterpart KR patent application 10-2017-7030242.
(Continued)

*Primary Examiner* — John Olszewski
*Assistant Examiner* — Gerrad A Foster

(57) ABSTRACT

A method is specified for monitoring an electronic control unit for a motor vehicle. An electronic control unit with a monitoring circuit, which contains at least one sensor component, is provided. A measured value is recorded by means of the at least one sensor component, on the basis of which an actual value of a characteristic value representative for the thermal, mechanical and/or chemical loading of the control unit is determined and compared with a predetermined set-point value. A signal is emitted as a function of the result of the comparison. A device and a control unit are additionally specified.

22 Claims, 2 Drawing Sheets

(52) U.S. Cl.
CPC ... *G05B 23/0283* (2013.01); *B60W 2050/021* (2013.01); *B60W 2050/041* (2013.01); *G05B 2219/2637* (2013.01); *G05B 2219/32226* (2013.01); *Y02P 90/14* (2015.11)

(56) References Cited

U.S. PATENT DOCUMENTS

| | | | |
|---|---|---|---|
| 2006/0016260 A1 | 1/2006 | Smith | |
| 2007/0299575 A1 | 12/2007 | Yamada et al. | |
| 2009/0231123 A1* | 9/2009 | Rowell | B61B 12/06 340/532 |
| 2010/0049403 A1* | 2/2010 | Gillman | B62D 5/0406 701/43 |
| 2013/0179003 A1 | 7/2013 | Shinichi et al. | |

FOREIGN PATENT DOCUMENTS

| | | |
|---|---|---|
| CN | 1981251 A | 6/2007 |
| CN | 101103265 A | 1/2008 |
| CN | 101264763 A | 9/2008 |
| CN | 101983143 A | 3/2011 |
| CN | 202574070 U | 12/2012 |
| CN | 102933443 A | 2/2013 |
| CN | 103455026 A | 12/2013 |
| CN | 109727336 A | 5/2019 |
| DE | 102004006848 A1 | 9/2005 |
| DE | 60014709 | 10/2005 |
| DE | 102004017660 A1 | 10/2005 |
| DE | 102008019463 A1 | 11/2008 |
| DE | 102009046394 A1 | 5/2011 |
| DE | 102009058331 A1 | 6/2011 |
| JP | H1141792 A | 2/1999 |
| JP | 2003009312 A | 1/2003 |
| JP | 2008001233 A | 1/2008 |
| JP | 2008507714 A | 3/2008 |
| JP | 2015040148 A | 3/2015 |
| WO | WO2012043167 A1 | 2/2014 |

OTHER PUBLICATIONS

Chinese Office Action dated Aug. 20, 2019 for corresponding Chines Patent Application No. 201680024497.8.

* cited by examiner

METHOD FOR MONITORING AN ELECTRONIC CONTROL UNIT AND CONTROL UNIT FOR A MOTOR VEHICLE

CROSS REFERENCE TO RELATED APPLICATIONS

This application claims the benefit of PCT Application PCT/EP2016/059457, filed Apr. 28, 2016, which claims priority to German Patent Application 10 2015 207 895.7, filed Apr. 29, 2015. The disclosures of the above applications are incorporated herein by reference.

FIELD OF INVENTION

The present disclosure relates to a method for monitoring an electronic control unit for a motor vehicle and a device for carrying out the method. Furthermore, the present disclosure relates to a control unit for a motor vehicle.

BACKGROUND

The failure of an electronic control unit in a motor vehicle can impair the function of the system as a whole. In particular, the function of the motor vehicle can likewise be disrupted or the vehicle may become completely inoperable. An unforeseeable failure of the motor vehicle may lead to financial, time and health losses, for example due to accidents or unplanned downtime of the motor vehicle.

SUMMARY

It is therefore the object of the present invention to specify a method for monitoring an electronic control unit and a control unit, using which a particularly low risk for an unforeseen failure of the control unit may be achieved.

According to a first aspect, a method is specified for monitoring an electronic control unit for a motor vehicle. According to a further aspect, a device is specified for carrying out the method. According to a third aspect, a control unit for a motor vehicle is specified. The control unit preferably constitutes the device for carrying out the method. Insofar as individual features are only described on the basis of one aspect—e.g., of the method or the control unit or the device—in the following, this is not to be interpreted as limiting. Rather, the respective features are also provided for the other aspects, for which they are not explicitly disclosed.

The electronic control unit is provided according to one step of the method. The control unit has a control circuit. The control circuit is constructed for controlling an operating function of the motor vehicle. In the present context, this is also understood to mean circuits which are constructed to regulate an operating function of the motor vehicle. The controlled or regulated operating function of the motor vehicle may for example be the injection of fuel into an internal combustion engine of the motor vehicle, the air supply to the internal combustion engine and/or the injection of a reducing agent into the exhaust tract. The circuit may also be provided to regulate the braking force, to control a gearbox of the motor vehicle, to support the steering, etc.

In addition, the control unit has a monitoring circuit. The monitoring circuit contains at least one sensor component.

The device for carrying out the method expediently contains the control circuit, the monitoring circuit and the at least one sensor component.

According to a further step of the method, a measured value is recorded by means of the at least one sensor component. The recording of the measured value takes place depending on the type of sensor component, for example by measuring the resistance and/or the inductance and/or the capacitance of the sensor component or by reading the sensor component according to a predetermined communication protocol.

According to a further method step, an actual value of a characteristic value is determined by means of the monitoring circuit on the basis of the recorded measured value. The characteristic value is in particular different from a purely temporal characteristic value—such as, e.g., the operating time or the age of the control unit—and preferably dependent on the environmental conditions to which the control unit is exposed. The characteristic value is in particular a characteristic value representative for the thermal, mechanical and/or chemical loading of the control unit.

The actual value is compared with a predetermined set-point value of the characteristic value by means of the monitoring circuit. The set-point value is preferably chosen in such a manner that when a thermal, mechanical and/or chemical loading corresponding to the set-point value of the characteristic value is reached, the control unit has a probability of 30% or more, preferably of 50% or more, of still being operative for 150 operating hours or longer, e.g., another month or longer, for controlling the operating function of the motor vehicle by means of the control circuit. In other words, the following applies for the survival function R(t) of the control unit when the set-point value is reached: R(150 h)>30%, preferably R(150 h)>50%; and in particular R(1 month)>30%, preferably R(1 month)>50%.

According to a further method step, a signal is emitted by means of the monitoring circuit as a function of the result of the comparison. In particular, the signal is emitted if the actual value overshoots or undershoots the set-point value in the direction of a higher thermal, mechanical or chemical loading of the control unit.

Advantageously, in this manner, the risk of an unforeseen failure of the control unit is particularly low. In contrast, for example, to a service-hour counter, the actual loading of the individual control unit—which may differ, e.g. due to different usage, from the loading of different, structurally identical control units—is referred to for the monitoring of the control unit.

The user advantageously has sufficient time to react to the signal, in order, for example, to replace the unit before a loss of function occurs. A particularly complicated and cost-intensive design of the control unit for a particularly strong thermal, mechanical and/or chemical loading may be avoidable owing to the monitoring of the state of the control unit by means of the monitoring circuit.

The thermal, mechanical and/or chemical loading measured by means of the monitoring circuit may additionally also be used for planning the maintenance intervals of different vehicle constituents. For example, further control units or mechanical subassemblies may be considered for this, which are exposed to the detected loads in the same way and are sensitive to the same.

Particularly in cases in which the target lifespan of the motor vehicle exceeds technological limits for the lifespan of individual components of the control unit, a particularly reliable and beneficial function of the motor vehicle may be achieved over the entire lifespan. For example, the maintenance of the control unit may be particularly inexpensive, as the time for a replacement, which may be necessary, does not have to be determined on the basis of time-based maintenance intervals, but rather may be determined on the basis of the actual loading of the control unit. Thus, the maintenance interval until the replacement of the control unit in particular may be extended. In this manner, series technology developed for passenger vehicles may, for example, be used with a cost advantage for HGVs, although the requirements for the lifespan and the loading of the control unit are higher there.

In an embodiment of the method, the at least one sensor component contains at least one component from the following group: temperature sensor, acceleration sensor, vibration sensor, moisture sensor, sulfur sensor, corrosion sensor. In this case, the component is specified in particular for the measurement of the temperature, the acceleration, the vibration, the moisture, the sulfur concentration or the concentration, for example, on the basis of the data sheet thereof. A particularly simple recording of the measured value may be achieved by means of such sensors.

In a development, the determination of the actual value includes the evaluation of at least one of the following parameters on the basis of the recorded measured value: temperature, number and/or size of temperature fluctuations, maximum temperature, minimum temperature, number of temperature cycles, number and/or strength of mechanical impacts, duration and/or intensity of mechanical vibrations, corrosion, sulfur concentration, air humidity. In this case, the predetermined set-point value is, for example, determined on the basis of a lifespan model of the evaluated parameters. The failure probability may be predicted particularly well in this manner using a simulation.

In an embodiment, the method has the additional steps:
saving the actual value,
recording a further measured value by means of the at least one sensor component following the comparison of the actual value with the set-point value,
determining a new actual value of the characteristic value by means of the monitoring circuit on the basis of the recorded further measured value and the saved actual value and comparing the new actual value with the set-point value,
emitting a further signal by means of the monitoring circuit as a function of the result of the comparison of the new actual value with the set-point value.

In this way, the calculation of the new actual value may take account of past states of the control unit for the monitoring. Thus, for example, the accumulated sulfur exposure, the number of temperature cycles, etc., may easily be evaluated in the characteristic value.

In another embodiment of the method, the characteristic value is representative of the thermal, mechanical and/or chemical loading of the at least one sensor component. In this case, the loading of the at least one sensor component is also understood to mean the loading of the fastening thereof in the control unit. One example for this is the aging of soldering points, at which the sensor component is, for example, fastened on a printed circuit board of the control unit. In this way, the failure probability of the control unit may be determined in a particularly precise manner, for example as modeling of the aging behavior of the components does not have to take place.

In an expedient development of this embodiment, the control circuit contains at least one electric or electronic component, which is of the same type as the at least one sensor component and which is less sensitive with respect to the thermal, mechanical and/or chemical loading than the at least one sensor component. In other words, an electric or electronic component is used as sensor component, which is identical in design to a component of the control circuit, and which has a higher failure probability than the component of the control circuit at the same thermal, mechanical or chemical loading. In this manner, a particularly high reliability of the monitoring may be achieved.

In particular, the sensor component and the corresponding component of the control circuit are in this case preferably standard components such as resistors, coils, capacitors or diodes. Components of this type are often less expensive than the precision sensors mentioned above.

It is advantageous in terms of cost that in this embodiment, no software is required for calculating the lifespan model, this does not have to be calibrated in a complex manner and secondary parameters (for example, the exact temperature curve, moisture, etc.) do not have to be calculated separately in the lifespan model. A known, for example, geometrically based difference in the lifespan of the two components may advantageously suffice. In addition, the determination of the current state of the sensor component also takes account of the loading of the control unit in the past in a simple manner. In this case, the monitoring also extends to periods in which the control unit—for example, in the unpowered state—is not operating.

In an expedient embodiment, the monitoring circuit is different from the control circuit. That means in particular that the monitoring circuit does not contribute to the control or regulation of an operating function of the motor vehicle. Rather, the monitoring circuit is provided—preferably exclusively—in this embodiment for monitoring a state of the control unit. This does not preclude the control unit containing an integrated circuit—for example, a microcontroller—which is included both in the control circuit and in the monitoring circuit. In this embodiment, the control circuit and the monitoring circuit are, however, separated from one another in such a manner that the failure of components of the monitoring circuit—or in particular the failure of the at least one sensor component—does not impair the functionality of the control circuit.

In another embodiment, the control circuit contains a plurality of similar electric or electronic components, which together contribute to controlling the operating function of the motor vehicle. The similar components are connected to one another in such a manner that the failure of an individual component of the similar components does not impair the functionality of the control circuit for controlling the operating function. For example, the similar components are a multiplicity of parallel-connected resistors. In this embodiment, the similar components may constitute the sensor components. The failure of an individual or a portion of the similar components may then expediently be detected for determining the actual value. In this case, the portion corresponds to a number of the similar components, the failure of which does not impair the functionality of the control circuit for controlling the operating function. For example, the total resistance of the parallel-connected resistors may be recorded as measured value by means of the monitoring circuit.

This embodiment makes use of the idea that, for a plurality of similar components, not all of the components fail at the same loading. By monitoring the failure of individual components, an increased risk for a malfunction of the control circuit may be recognized already before so many components actually fail that the malfunction occurs. The risk for an unforeseen failure of the control unit is therefore particularly low. At the same time, it is possible, with a cost advantage, to dispense with special sensor components which do not belong to the control circuit.

In an expedient embodiment of the method, the signal is emitted during operation of the control unit for controlling the operating function of the motor vehicle by means of the control circuit. In the present context, "operation of the control unit for controlling the operating function of the motor vehicle" is also understood to mean a start-up phase—for example, when starting the ignition of the motor vehicle—in which the control unit executes a self-test, for example. In this manner, the monitoring of the control unit may be integrated into the self-test of the motor vehicle when starting the ignition, in a particularly simple manner.

In an embodiment of the method, the emitted signal is a warning signal. The signal may expediently be represented by means of an acoustic and/or optical indicating element. The indicating element is an indicator lamp or a sound generator, for example. Alternatively or additionally, the signal or a value corresponding to the signal may be saved in a fault memory of the motor vehicle. Such a processing of the signal is particularly advantageous for fault diagnosis.

In an embodiment of the method, a plurality of different set-point values are predetermined, which correspond to different failure probability levels of the control unit, for example a first set-point value, a second set-point value and a third set-point value, wherein the second set-point value corresponds to a higher failure probability than the first set-point value and the third set-point value corresponds to a higher failure probability than the second set-point value.

For example, in this embodiment, a first signal may be emitted when the first set-point value is overshot, which signal is saved in a fault memory of the motor vehicle, for example. In this manner, the first signal is in particular only visible when reading the fault memory. When the second set-point value is overshot, a second signal is emitted for example, which is saved in the fault memory of the motor vehicle and which is signaled by means of the indicating element. In this manner, it is possible, for example, to signal the necessity of an unplanned replacement of the control unit.

When the third set-point value is overshot, the monitoring circuit emits a third signal for example, which causes the control unit to change to an emergency operation mode. In this manner, it is possible to reduce the risk for uncontrolled states if components of the control circuit are already at serious risk of failure. The full functionality of all components is still advantageously ensured when the control unit changes to the emergency operation mode. Advantageously, it is not necessary to react to the failure of a component of the control circuit.

In an embodiment, the electronic control unit has the control circuit, which is constructed for controlling an operating function of the motor vehicle, and the monitoring circuit, which contains the at least one sensor component. In this case, the control unit is constructed, by means of the monitoring circuit in particular, for recording a measured value by means of the at least one sensor component, for determining an actual value of a characteristic value representative for the thermal, mechanical and/or chemical loading of the control unit on the basis of the recorded measured value, for comparing the actual value with a predetermined set-point value of the characteristic value, and for emitting a signal as a function of the result of the comparison.

In an embodiment, the characteristic value is representative of the thermal, mechanical and/or chemical loading of the at least one sensor component and the control circuit has an electric or electronic component, which is of the same type as the sensor component and which is less sensitive with respect to the thermal, mechanical and/or chemical loading than the respective sensor component. In the case of a plurality of sensor components, the control circuit preferably has an electric or electronic component for each sensor component, which is of the same type as the respective sensor component and is less sensitive with respect to the thermal, mechanical and/or chemical loading than the respective sensor component. For example, in this embodiment, the monitoring circuit is preferably different from the control circuit.

In an embodiment, the monitoring circuit contains a plurality of diverse sensor components and/or a plurality of sensor components with different sensitivity. Alternatively or additionally, it is also conceivable that the monitoring circuit contains a plurality of structurally identical sensor components. In this manner, various characteristic values may be monitored and/or the aging of different components of the control circuit may be monitored and/or different failure probability levels may be differentiated. Thus, it is possible to achieve a particularly low risk of an unforeseen failure of the control unit.

In a development, the sensor components are in particular connected in series in the monitoring circuit. Thus, monitoring is, for example, possible by means of a measurement of the state of all sensor components at the same time. Alternatively, the sensor components may also be connected in parallel. It is also possible in this case—for example, on the basis of the electrical resistance—to measure the failure of one or more of the sensor components. As a further alternative, it is also conceivable that the sensor components are connected to a microcontroller individually. In this manner, the sensor components may advantageously be monitored individually.

In an embodiment of the control unit, the sensor component or one of the sensor components is a resistor, and in particular a ceramic resistor, which has a larger mass and a larger volume than the corresponding component of the control circuit. In this manner, it is for example possible to measure aging or a failure of soldering points, to which the resistor is fastened. This may, for example, be triggered by thermal cycles and/or by mechanical vibrations.

In another embodiment, the sensor component or one of the sensor components is a resistor, the metal surfaces, and in particular exposed metal surfaces, of which are larger than that of the respective component of the control circuit. In this case, the sensor component is a resistor array in particular while the corresponding component of the control circuit is a single resistor in particular. The metal surface is a silver surface in particular. In this manner, aging may be monitored by means of sulfur exposure. In a development, the sensor component may alternatively or additionally be provided with fine—in particular exposed—metal structures, which are constructed in a targeted manner for corrosion in the case of sulfur exposure.

In a further embodiment, the sensor component or one of the sensor components is a coil. In particular, the coil is designed to be mechanically weaker than the coil(s) in the control circuit, which constitute(s) the corresponding component(s). Coil components may be particularly susceptible to vibration fatigue.

In a further embodiment, the sensor component or one of the sensor components is an electrolytic capacitor. In this case, the capacitance of the electrolytic capacitor is preferably measured as measured value. The actual capacitance is particularly suited to detecting thermal aging of the electrolytic capacitor.

In a further embodiment, the sensor component or one of the sensor components is a diode. For example, it may be a diode of an ASIC of the control unit, which diode is constructed with a diffusion barrier, which is reduced compared to the diffusion barrier of the corresponding component of the control circuit, or which diode is constructed without a diffusion barrier. The diode is a supercritical diode, for example. In this manner, it is possible to monitor the thermal aging, thermally driven diffusion in particular—particularly in the semiconductor material—in a simple manner.

In a development, the monitoring circuit measures the volume resistance of a series connection of a ceramic resistor, a resistor array and a coil, particularly by means of a microcontroller. A warning signal is emitted in particular if the volume resistance overshoots a predetermined set-point resistance value.

In another embodiment, the control circuit contains a plurality of similar electric or electronic components. The similar components are connected to one another in such a manner that together they contribute to controlling the operating function of the motor vehicle. In addition, the components are connected to one another in such a manner that the failure of an individual component of the similar components does not impair the functionality of the control circuit (CC) for controlling the operating function, e.g., this is a multiplicity of parallel-connected resistors.

In this embodiment, the similar components may expediently constitute the sensor components. The monitoring circuit is constructed for detecting the failure of an individual or a portion of the similar components for determining the actual value.

Thus, the characteristic value is in particular not only representative of the thermal, mechanical and/or chemical loading of the sensor components, but rather in an identical manner for the thermal, mechanical and/or chemical loading of the similar components contributing to controlling the operating function of the motor vehicle. As, in this manner, the sensor components are exposed to identical loading due to the operation of the control unit as the components of the control circuit and are also structurally identical, it is possible to achieve a particularly good prediction of the failure probability of the control unit.

In an expedient embodiment of the control unit, the control circuit, the monitoring circuit and the at least one sensor component are arranged together in a housing of the control unit. The housing is, for example, sealed against the penetration of moisture. Due to the arrangement of the sensor components and the monitoring circuit in the same housing as the control circuit, it is possible to monitor the thermal, mechanical and/or chemical loading of the control circuit particularly accurately. In particular, the sensor components and the control circuit have the same environmental conditions, such as temperature, vibrations or sulfur concentration, in the common housing as the control circuit.

Further advantages and advantageous configurations and developments of the method, the device and the control unit emerge from the following exemplary embodiments illustrated in connection with the figures.

BRIEF DESCRIPTION OF THE DRAWINGS

In the figures.

Identical, similar or identically acting elements are provided with the same reference numbers in the figures. In some figures, individual reference numbers and elements may be omitted to improve clarity. The figures and the size ratios, with respect to one another, of the elements illustrated in the figures are not to be considered as being to scale. Rather, individual elements may be illustrated at an exaggerated size for better representation and/or for better understanding.

DETAILED DESCRIPTION

Figure 1:
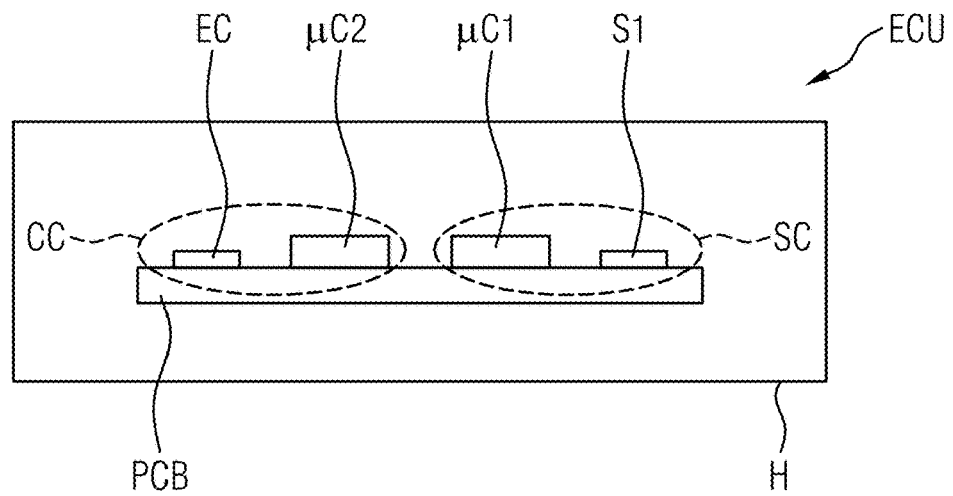
FIG. 1 shows a schematic sectional illustration of a control unit according to a first exemplary embodiment.

FIG. 1 shows a control unit ECU according to a first exemplary embodiment in a very schematized sectional illustration.

The control unit ECU has a housing H, in which a printed circuit board PCB is arranged. A control circuit CC and a monitoring circuit SC, which are different from one another, are formed by means of conductor tracks on the printed circuit board PCB and further components. In the present case, the control circuit CC contains an electric or electronic component EC and a microcontroller µC2. The monitoring circuit SC contains a further microcontroller µC1 and a sensor component S1. During normal operation of the control unit, the sensor component S1 does not contribute to controlling an operating function of the vehicle. The control circuit CC with the component EC and the microcontroller µC1, the monitoring circuit SC with the sensor component S1 and the microcontroller µC2, and also the printed circuit board PCB are arranged in the common housing H. The functions of the two microcontrollers µC1 and µC2 may also be realized in a single microcontroller. In one design, the sensor component S1 is a sulfur sensor.

In an exemplary embodiment of a method for monitoring the electronic control unit ECU, a measured value M1 for the sulfur concentration is recorded by means of the sensor component S1. The recorded measured value M1 is calculated by means of the monitoring circuit SC using a value which results from earlier measurements of the sulfur concentration by means of the sensor component S1 and which is read in particular from an internal memory inM of the microcontroller µC1. An actual value for the sulfur exposure of the control unit ECU is determined in this manner. The sulfur exposure is a characteristic value representative of a chemical loading of the control unit ECU.

The recorded actual value is compared with a predetermined set-point value, which is read from the memory inM in particular. If the actual value overshoots the set-point value, a signal I is output by means of the monitoring circuit SC and transmitted from the control unit ECU to a different component of the vehicle electronics.

In this case, the determination of the sulfur exposure is not to be understood as limiting. Different characteristic values and sensor components S1 corresponding thereto may also be used—particularly as described above in the general part—which then monitor a mechanical or thermal loading of the control unit ECU, for example.

Figure 2:
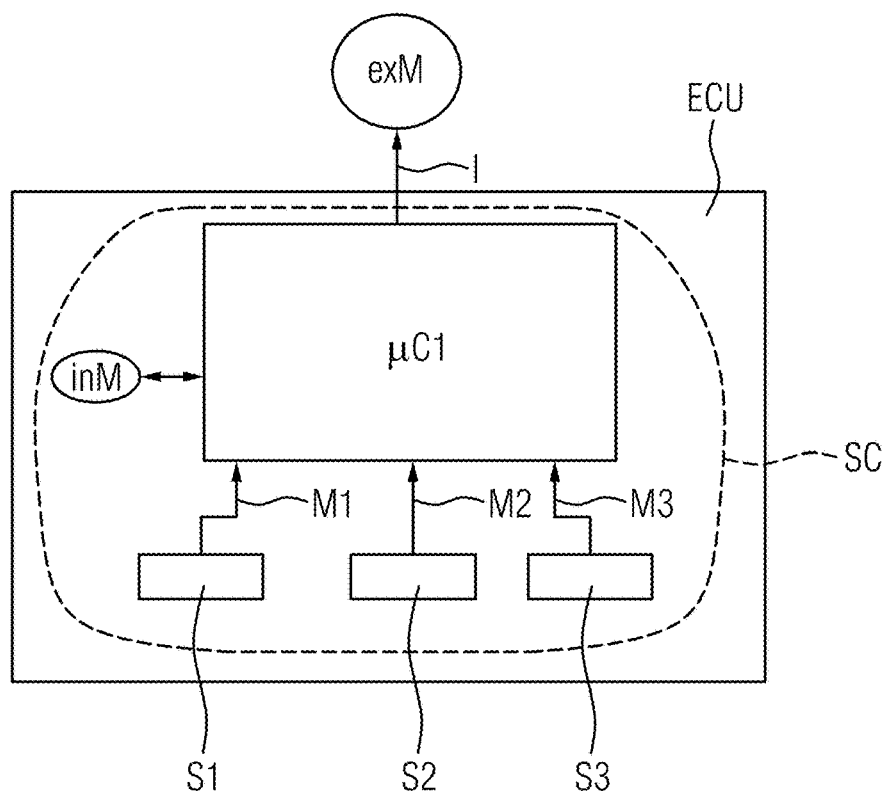
FIG. 2 shows a very schematized circuit diagram of a control unit according to a second exemplary embodiment.

FIG. 2 shows a very simplified circuit diagram of a control unit ECU according to a second exemplary embodiment. The control unit ECU according to the second exemplary embodiment essentially corresponds to that of the first exemplary embodiment. For the sake of simplicity, the control circuit CC and the constituents thereof are omitted in the circuit diagram.

In contrast to the first exemplary embodiment, the monitoring circuit SC of the control unit ECU of the second exemplary embodiment contains a plurality of sensor components S1, S2, S3. By means of the microcontroller µC1, measured values M1, M2, M3 of the sensor components S1, S2, S3 are recorded by the monitoring circuit SC and referred to for determining the actual value of a characteristic value or alternatively for determining actual values of a plurality of characteristic values.

The actual values or values corresponding thereto are saved in an internal memory inM of the control unit ECU and read and taken into account when determining the actual values of subsequent measurements. The internal memory inM may be integrated in the microcontroller µC1 or may be constructed as an additional component.

The signal I emitted as a function of the comparison result of the actual value or the actual values with a set-point value or corresponding set-point values of the characteristic value(s) is forwarded by means of a signal line from the control unit of the ECU to a different component of the vehicle electronics and a value corresponding to the signal is saved in a fault memory exM. For example, the monitoring circuit SC may be constructed for emitting various signals I as a function of the actual values of the various sensor components S1, S2, S3, which signals correspond to variously strong thermal, mechanical and/or chemical loading of the control unit ECU.

Figure 3:
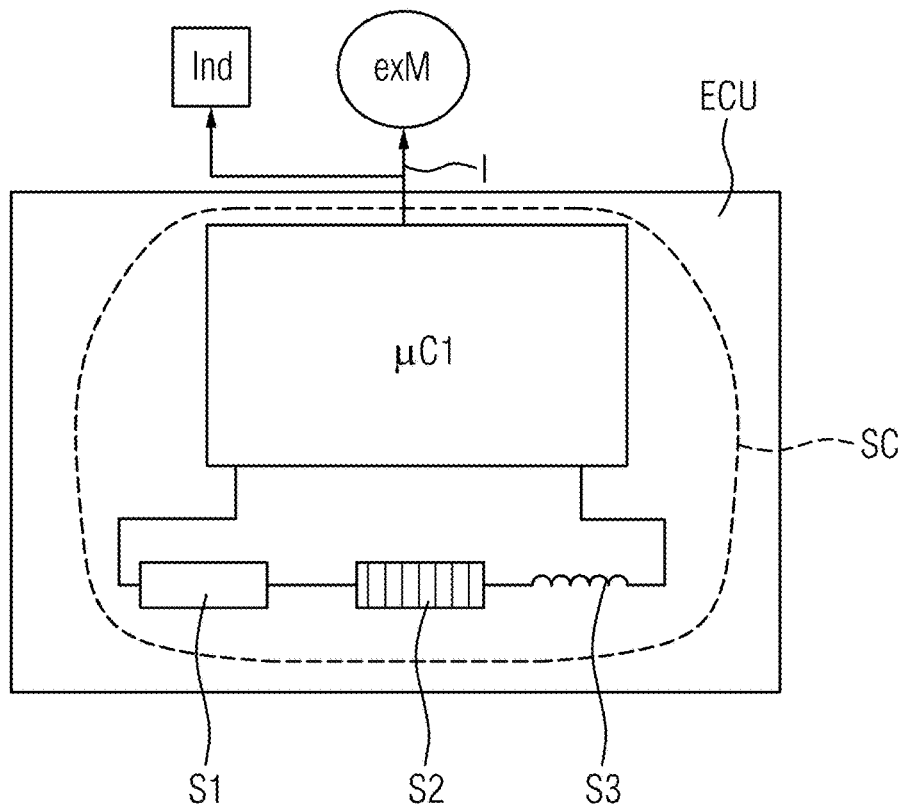
FIG. 3 shows a very schematized circuit diagram of a control unit according to a third exemplary embodiment.

FIG. 3 shows a very schematized circuit diagram of a control unit ECU according to a third exemplary embodiment. The control unit ECU of the third exemplary embodiment essentially corresponds to that of the second exemplary embodiment.

In contrast thereto, the signal I—or a value corresponding thereto—is not only saved in a memory exM however, but rather may additionally be signaled acoustically and/or optically by means of an indicating element Ind. The indicating element Ind is, for example, a constituent of an indicator panel—for example what is known as an instrument cluster—which is constructed to inform the driver of the motor vehicle about the state of the vehicle. An embodiment of the method for monitoring the control unit ECU, in which the signal I is indicated by means of such an indicating element Ind may also be used and is advantageous for other control units ECU, particularly as are described in connection with the FIGS. 1 and 2.

In addition, the control unit ECU according to the third exemplary embodiment is differentiated from that of the second exemplary embodiment in that no sensors which are specified for recording environmental influences—such as, for example, temperature sensors, vibration sensors, moisture sensors and the like—are used as sensor components S1, S2, S3; rather electric or electronic standard components such as resistors, coils, capacitors or diodes are used. The measurement of a characteristic value representative for the thermal, mechanical or chemical loading of the control unit ECU takes place in the present exemplary embodiment in particular by means of the measurement of a deviation of a characteristic value which is design-typical for the respective sensor component S1, S2, S3—particularly for a resistor, the ohmic resistance thereof; for a coil, the resistance and/or the inductance thereof; and for a capacitor, the capacitance thereof. In this manner, the measured characteristic value is representative in particular for the thermal, mechanical and/or chemical loading of the respective sensor component S1, S2, S3.

The sensor components S1, S2, S3 are in particular identical in design to standard components, such as resistors, coils, capacitors or diodes, which are used as electric or electronic components EC in the control circuit CC (omitted in turn in FIG. 3) of the control unit ECU. However, the sensor components S1, S2, S3 are designed in such a manner that they are more sensitive for a thermal, mechanical and/or chemical load than the corresponding components EC of the control circuit CC.

For example, in the monitoring circuit SC, a ceramic resistor is used as first sensor component S1, the mass and volume of which are larger than those of the largest ceramic resistor in the control circuit CC. For example, a ceramic resistor with the size 2510 according to the EIA standard may be used as sensor component S1 if only ceramic resistors with a size of 1206 or less according to the EIA standard are used in the control circuit CC. Due to the larger mass and dimensions thereof, the sensor component S1 is then more sensitive with respect to mechanical and/or thermal loading than the corresponding component EC of the control circuit CC. For example, the soldering-point aging of the sensor component S1 is accelerated compared to the corresponding component EC.

A resistor array with silver coating and fine metal structures, which in this manner is sensitive with respect to sulfur exposure, may for example be used as second sensor component S2. Only single resistors, in which less silver is exposed to the sulfur, are for example used as corresponding component EC of the control circuit CC.

A coil, which is designed to be weaker mechanically than the coils used in the control circuit CC as corresponding components EC, is for example used as third sensor component S3. The sensor component S3 is therefore, for example, more sensitive with respect to vibration fatigue.

In the present exemplary embodiment, the three sensor components S1, 2, S3 are electrically connected in series and the monitoring circuit SC compares the volume resistance of this series connection with a set-point resistance for recording the measured value. If the actual value of the volume resistance deviates too far from the predetermined set-point value, the monitoring circuit SC signals the end of the technological lifespan of the control unit ECU.

Figure 4:
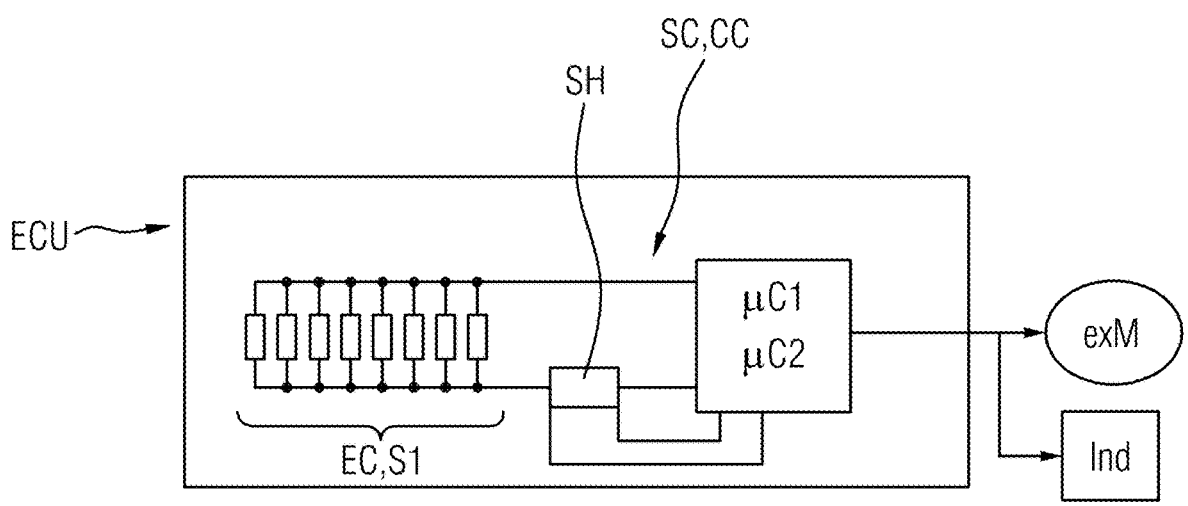
FIG. 4 shows a very schematized circuit diagram of a control unit according to a fourth exemplary embodiment.

FIG. 4 shows a very schematized circuit diagram of a control unit ECU according to a fourth exemplary embodiment. The control unit ECU of the fourth exemplary embodiment fundamentally corresponds to that of the first exemplary embodiment.

However, a multiplicity of similar and, in the present case also structurally identical components EC of the control circuit CC are used as sensor components S1. The sensor component S1 and the similar components EC respectively are therefore both a constituent of the control circuit CC and of the monitoring circuit SC. The control and monitoring circuits CC, SC may be identical in a development. In addition, in the present exemplary embodiment, the microcontrollers µC1, µC2 of the control and monitoring circuits CC, SC are not spatially separated components.

In the present exemplary embodiment, the similar components EC are structurally identical resistors. The number of resistors is chosen in such a manner that the failure of a single resistor does not impair the functionality of the control circuit CC for controlling the operating function of the motor vehicle.

The control unit ECU is, however, constructed by means of the monitoring circuit SC for determining the failure of individual sensor components S1—i.e., individual components of the similar components EC. For example, the resistance of the parallel connection of the resistors is determined as actual value. This may take place, e.g., with the aid of a shunt resistor SH for measuring the current flow.

The resistance is compared with the set-point value, which expediently corresponds to the resistance of the parallel connection when all components EC are operative. A warning signal may be emitted as a function of the comparison result, as described above for example in connection with the third exemplary embodiment. In this case, in a development, various warning stages—corresponding, e.g., to the first, second and third signals described in the general part—may correspond to different numbers of failed resistors.

The invention is not limited to the exemplary embodiments by the description based on the exemplary embodiments. Rather, the invention includes each novel feature and each combination of features, which includes each combination of features in the exemplary embodiments and patent claims in particular.

The invention claimed is:

1. A method for monitoring an electronic control unit for a motor vehicle, comprising:
    providing the electronic control unit, wherein the control unit has a control circuit which is constructed for controlling an operating function of the motor vehicle, and a monitoring circuit which contains at least one sensor component,
    measuring a parameter by the at least one sensor component,
    determining an actual value of a characteristic value representative of at least one of thermal, mechanical and chemical loading of the control unit by the monitoring circuit on the basis of the measured parameter, and comparing the actual value with a predetermined set-point value of the characteristic value, and
    emitting a signal by the monitoring circuit as a function of a result of the comparison,
wherein
    the characteristic value is representative of at least one of the thermal, mechanical and chemical loading of the at least one sensor component,
    the control circuit is different from the monitoring circuit,
    the at least one sensor component comprises at least one electric or electronic component, and
    the control circuit has at least one electric or electronic component which is of the same structure of electric or electronic component as the at least one electric or electronic component of the at least one sensor component and which is less sensitive with respect to the at least one of the thermal, mechanical and chemical loading than the at least one electric or electronic component of the at least one sensor component.

2. The method as claimed in claim 1, wherein the at least one sensor component contains at least one component from the following group: temperature sensor, acceleration sensor, vibration sensor, moisture sensor, sulfur sensor, and corrosion sensor.

3. The method as claimed in claim 1,
    wherein determining the actual value comprises evaluating at least one of the following parameters on the basis of the measured parameter: temperature, at least one of a number and a size of temperature fluctuations, maximum temperature, minimum temperature, a number of temperature cycles, at least one of a number and a strength of mechanical impacts, at least one of a duration and an intensity of mechanical vibrations, corrosion, sulfur concentration, and air humidity, and wherein the method further comprises determining the predetermined set-point value on the basis of a lifespan model of the at least one evaluated parameter.

4. The method as claimed in claim 1, further comprising:
    saving the actual value,
    measuring a further parameter by the at least one sensor component following the comparison of the actual value with the set-point value,
    determining a new actual value of the characteristic value, different from the saved actual value, by the monitoring circuit on the basis of the further measured parameter and the saved actual value and comparing the new actual value with the set-point value, and
    emitting a further signal by the monitoring circuit as a function of the result of the comparison of the new actual value with the set-point value.

5. The method as claimed in claim 1, wherein the signal is emitted during a start-up ignition phase of operation of the control unit for controlling the operating function of the motor vehicle by the control circuit.

6. The method as claimed in claim 1, wherein the emitted signal is a warning signal and is at least one of represented by at least one of an acoustic and an optical indicating element, and is saved in a fault memory of the motor vehicle.

7. The method as claimed in claim 1, wherein the electronic control unit having the control circuit, the monitoring circuit and the at least one sensor component are part of a device.

8. The method as claimed in claim 1, wherein the at least one sensor component comprises a plurality of electric or electronic components which are connected in series with each other.

9. The method as claimed in claim 1, wherein the emitted signal indicates a prediction of failure of the electronic control unit and reduces a possibility of unforeseen failure thereof.

10. A method for monitoring an electronic control unit for a motor vehicle, comprising:
    providing the electronic control unit, wherein the control unit has a control circuit which is constructed for controlling an operating function of the motor vehicle, and a monitoring circuit which contains at least one sensor component,
    measuring a parameter by the at least one sensor component,
    determining an actual value of a characteristic value representative of at least one of thermal, mechanical and chemical loading of the control unit by the monitoring circuit on the basis of the measured parameter, and comparing the actual value with a predetermined set-point value of the characteristic value, and
    emitting a signal by the monitoring circuit as a function of a result of the comparison, wherein the emitted signal is at least one of a warning signal to a driver of the motor vehicle that is represented by at least one of an acoustic and an optical indicating element, and saved in a fault memory of the motor vehicle to indicate an occurrence of a detection of a fault,
wherein
    the characteristic value is representative of the at least one of the thermal, mechanical and chemical loading of the at least one sensor component,
    the control circuit contains a plurality of electric or electronic components of the same type which together contribute to controlling the operating function of the motor vehicle and are connected to one another in such a manner that a failure of an individual component of the plurality of electric or electronic components does not impair the functionality of the control circuit for controlling the operating function, and the plurality of electric or electronic components constitute the at least one sensor component and the failure of an individual component of the plurality of electric or electronic components or a failure of a portion of the plurality of electric or electronic components is detected for determining the actual value.

11. The method as claimed in claim 10, wherein the plurality of electric or electronic components of the same type are connected in parallel with each other.

12. The method as claimed in claim 10, wherein the emitted signal indicates a time for replacing or performing maintenance of the electronic control unit.

13. An electronic control unit for a motor vehicle, comprising:
   a control circuit which is constructed for controlling an operating function of the motor vehicle; and
   a monitoring circuit which contains at least one sensor component,
   wherein the control unit is constructed and configured for:
   acquiring a measured parameter by the at least one sensor component,
   determining an actual value of a characteristic value representative of at least one of thermal, mechanical and chemical loading of the control unit on the basis of the acquired measured parameter,
   comparing the actual value with a predetermined set-point value of the characteristic value, and
   emitting a signal as a function of the result of the comparison, the emitted signal is at least one of a warning signal to an occupant of the motor vehicle that is represented by at least one of an acoustic and an optical indicating element, and saved in a fault memory of the motor vehicle to indicate an occurrence of a detection of a fault,
   wherein the control circuit contains a plurality of electric or electronic components of the same type which are connected to one another in such a manner that together the plurality of electric or electronic components contribute to controlling the operating function of the motor vehicle and that a failure of an individual component of the plurality of electric or electronic components does not impair the functionality of the control circuit for controlling the operating function, and
   wherein the at least one sensor component comprises the plurality of electric or electronic components and the monitoring circuit is constructed for detecting a failure of an individual or a portion of the plurality of electric or electronic components for determining the actual value.

14. The control unit as claimed in claim 13, wherein the control circuit, the monitoring circuit and the at least one sensor component are arranged together in a housing of the control unit.

15. The control unit as claimed in claim 13, wherein the at least one sensor component contains at least one component from the following group: temperature sensor, acceleration sensor, vibration sensor, moisture sensor, sulfur sensor, and corrosion sensor.

16. The control unit as claimed in claim 13, wherein the plurality of electric or electronic components of the same type are connected in parallel with each other.

17. The control unit of claim 13, wherein the emitted signal indicates a prediction of failure of the electronic control unit and reduces a possibility of unforeseen failure thereof.

18. An electronic control unit for a motor vehicle, comprising:
   a control circuit which is constructed for controlling an operating function of the motor vehicle; and
   a monitoring circuit which contains at least one sensor component,
   wherein the control unit is constructed and configured for:
   acquiring a measured parameter that is measured by the at least one sensor component,
   determining an actual value of a characteristic value representative of at least one of thermal, mechanical and chemical loading of the control unit on the basis of the recorded measured parameter,
   comparing the actual value with a predetermined set-point value of the characteristic value, and
   emitting a signal as a function of the result of the comparison, the emitted signal is at least one of a warning signal to an occupant of the motor vehicle that is represented by at least one of an acoustic and an optical indicating element, and saved in a fault memory of the motor vehicle to indicate an occurrence of a detection of a fault,
   wherein
   the characteristic value is representative of at least one of thermal, mechanical and chemical loading of the at least one sensor component,
   the at least one sensor component comprises at least one electric or electronic component, and
   the control circuit is different from the monitoring circuit and has at least one electric or electronic component for each sensor component, which is of the same structure of electric or electronic component as the respective sensor component and is less sensitive with respect to the at least one of the thermal, mechanical and chemical loading than the respective sensor component.

19. The control unit as claimed in the claim 18, wherein the monitoring circuit contains a plurality of sensor components, the sensor components being different types of sensor components which are connected in series in the monitoring circuit.

20. The control unit as claimed in claim 18, wherein the control unit comprises an application specific integrated circuit (ASIC) and the at least one sensor component is selected from the following group:
   a ceramic resistor which has a larger mass than the respective component of the control circuit,
   a resistor, an exposed metal surface of which is larger than that of the respective component of the control circuit,
   a resistor array and the component of the control circuit is a single resistor,
   a coil,
   an electrolytic capacitor, a capacitance of the electrolytic capacitor indicating thermal aging thereof, and
   a diode of the ASIC of the control unit, constructed with a reduced or omitted diffusion barrier compared with the respective component of the control circuit.

21. The control unit as claimed in claim 18, wherein the at least one sensor component comprises a plurality of electric or electronic components which are connected in series with each other.

22. The control unit of claim 18, wherein the emitted signal indicates a time for replacing or performing maintenance of the control unit.

* * * * *